United States Patent [19]

Henigue

[11] Patent Number: 4,975,235
[45] Date of Patent: Dec. 4, 1990

[54] METHOD OF MOLDING A FIBER-REINFORCED COMPOSITE STEERING WHEEL

[75] Inventor: Christian Henigue, Delle, France

[73] Assignee: ECIA- Equipements et Composants Pour l'Industrie Automobile, Audincourt, France

[21] Appl. No.: 401,478

[22] Filed: Aug. 29, 1989

Related U.S. Application Data

[62] Division of Ser. No. 248,073, Sep. 23, 1988, Pat. No. 4,875,387.

[30] Foreign Application Priority Data

Sep. 25, 1987 [FR] France .................................. 87 13323

[51] Int. Cl.⁵ ...................... B29C 43/10; B29C 43/18; B62D 1/04
[52] U.S. Cl. ................................... 264/257; 264/322; 264/324; 74/552
[58] Field of Search ............... 264/257, 258, 322, 324, 264/343; 74/552

[56] References Cited

FOREIGN PATENT DOCUMENTS 1582846 1/1981 United Kingdom ................ 264/258

Primary Examiner—Jay H. Woo
Assistant Examiner—Jeremiah F. Durkin, II
Attorney, Agent, or Firm—Sughrue, Mion, Zinn, Macpeak & Seas

[57] ABSTRACT

Process for producing a light steering wheel having a central hub, a peripheral rim and radial arms interconnecting the hub and the rim. The process is carried out by using a mould including a punch and a matrix having an impression in the shape of the steering wheel to be produced. The impression is at least partially filled with blanks of synthetic material charged with long fibers which are uninterrupted in each blank. The steering wheel, in the shape of the impression, is directly produced in one operation by stamping the blanks in the mould with the punch to shape the blanks into the steering wheel. The blanks are placed edgewise in the mould and are unshaped relative to the shape of the produced steering wheel.

9 Claims, 2 Drawing Sheets

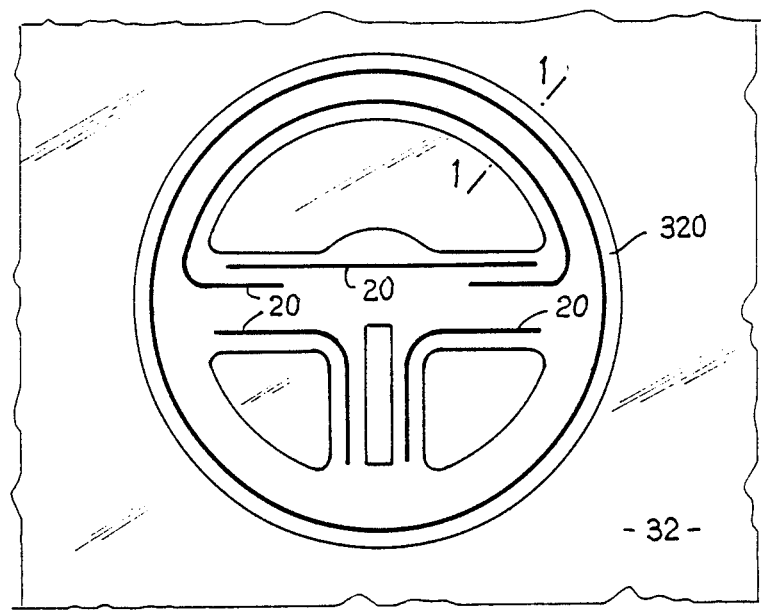
FIG. 2
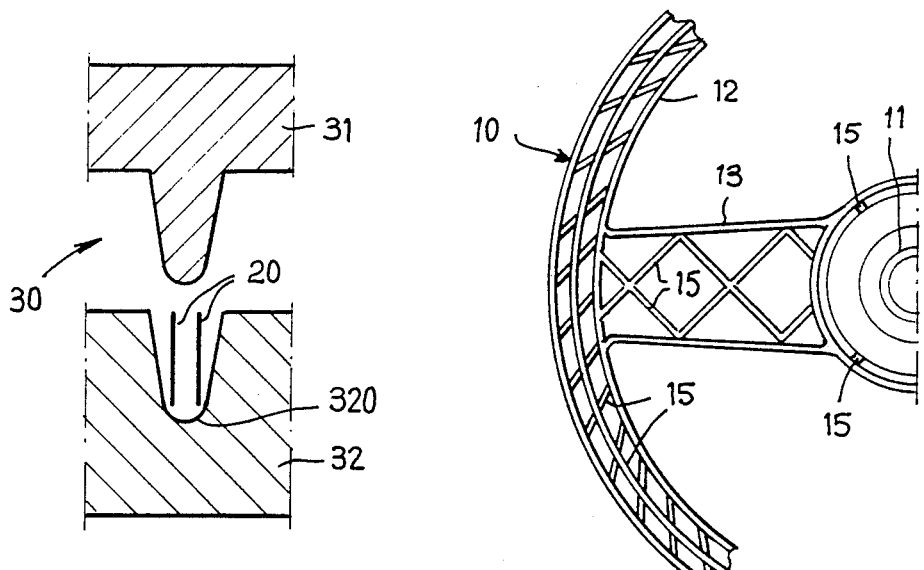
FIG. 1
FIG. 4

METHOD OF MOLDING A FIBER-REINFORCED COMPOSITE STEERING WHEEL

This is a division of application Ser. No. 248,073, filed Sept. 23, 1988, now U.S. Pat. No. 4,875,387.

BACKGROUND OF THE INVENTION

The invention relates to steering wheels, particularly for motor vehicles and, more particularly relates to a lightened steering wheel, particularly for this type of use, produced from a stampable, reinforced, synthetic material, and a process for the manufacture of such a steering wheel.

Steering wheels, particularly of motor vehicles, have to meet conflicting requirements.

For example, they have to be relatively light in order to have a reduced mass and a small moment of inertia with respect to the axis of the steering column for reasons particularly of comfort. The small mass means that, when the vehicle is moving at high speed or on carriageways which are in poor condition, the steering wheel does not vibrate. The small moment of inertia facilitates manoeuvring steering locks and changes in direction when the vehicle is used.

Moreover, for reasons of safety, the steering wheel has to be capable of withstanding considerable deformations resulting from stresses in the event of violent impact, particularly from the front. In particular, if the driver's thorax comes into contact with the steering wheel the latter must not give rise to contusion injuries or cause wounds by cutting or piercing.

It will therefore be seen that it is not a simple matter to manufacture a motor vehicle steering wheel which satisfies all these constraints and which also has a relatively modest cost price.

As well as these technical constraints, aesthetic requirements should be added since the steering wheel must have an attractive appearance and a pleasant feel when touched.

According to the prior art, various solutions have already been proposed for constructing steering wheels which meet most of these requirements.

A steering wheel comprises, essentially, a central hub and a peripheral rim which are connected together by at least one approximately radial branch or arm.

Excluding the hub, which is generally made of metal, such steering wheels generally comprise other metallic components. The current trend is to use such a metallic hub and to combine it with a rim and branches with metallic reinforcements or frames in order to meet both mechanical and safety constraints.

As set forth in the French Patent Application No. 2,518,479, use is made of a metallic hub with which branches and a rim are combined, which are obtained by means of a double injection moulding technique during which firstly the outer part made of a plastic material is manufactured, which acts as a shell into which another, charged plastic material, acting as a core, is then injected.

According to another technique which is the subject of European Patent Application No. 0,139,015, a steering wheel is manufactured with metallic branches and hub with which a rim made of a plastic material charged with continuous fibres is combined.

According to another technique described in European Patent Application No. 0,173,826, use is made, for the branches and the rim, of continuous, long fibres embedded in a resin which is wound and with which slotted metallic sleeves, allowing a suitable winding of the fibres whilst avoiding cleavage of their various layers in the zones where they diverge, is combined.

As may be seen, none of these techniques uses only plastic material reinforced with fibres for producing the rim and/or the branches in the manufacture of a steering wheel particularly for a motor vehicle.

SUMMARY OF THE INVENTION

The invention aims to manufacture a lightened steering wheel, particularly for a motor vehicle, whose only metallic part is its hub in order to meet all the usual constraints.

In the present text, "steering wheel" refers to the inner part of the latter which has a "mechanical" role and excludes any subsequent outer covering giving it its final appearance which is pleasant to look at and to the touch.

To this end, according to the invention, use is made of a semi-manufactured product consisting of a synthetic material and fibres whose relative percentage on a mass basic is very considerable with respect to the synthetic material which coats them so that they may be easily handled, as they are, in the form of a blank. This semi-manufactured product is used after optional heating of the blanks for filling a mould comprising a punch and a matrix with an impression of the object to be produced in order to compress it therein with an energy and a speed which enable it to be shaped by stamping without breakage of the long or continuous component fibres. Use is preferably made of multiple blanks of semi-manufactured product of the same type or otherwise so as to produce an orientation and a density of the fibres which meets the mechanical and safety constraints.

By virtue of the invention it is possible to produce a suitable steering wheel, whose only metallic part is the hub, in a single operation.

The subject of the invention is a lightened steering wheel, particularly for a motor vehicle, comprising, inter alia, a central hub, a peripheral rim, and at least one approximately radial arm or branch connecting hub and rim. According to the invention, this steering wheel is noteworthy in that at least rim and branch are made from blanks of a semi-manufactured product of at least one stampable, synthetic material charged with long fibres.

The subject of the invention is also a process for manufacturing a lightened steering wheel, particularly for a motor vehicle, of the type indicated above using a mould having a punch and a matrix provided with an impression of the steering wheel to be produced. According to this process, the impression is filled at least partially with blanks (as opposed to preformed sheets) of at least one semi-manufactured product made from a synthetic material charged with fibres and these blanks are shaped by stamping.

Other characteristics of the invention will emerge from reading the following description and claims and from examining the appended drawing, which is given solely by way of example, wherein:

BRIEF DESCRIPTION OF THE DRAWINGS

FIG. 1 is a partial diagrammatic radial section of one embodiment of the invention illustrated in FIG. 2;

FIG. 2 is a diagrammatic plan view of the charged matrix of FIG. 1;

FIG. 4 is a view from below of a steering wheel according to the invention.

DETAILED DESCRIPTION OF PREFERRED EMBODIMENTS

Figure 3A:
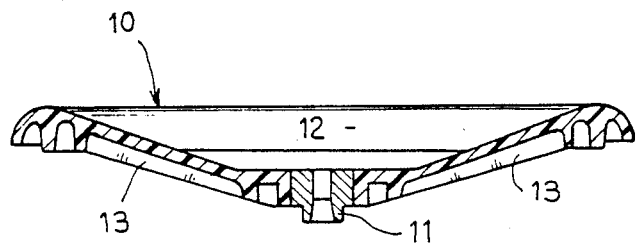
FIGS. 3A, 3B and 3C are longitudinal sections of embodiments of a steering wheel according to the invention.

Since steering wheels for motor vehicles are well known in the prior art, a description will be given only of what relates to the invention. For the remainder, the specialist in the art in question will draw on the solutions available to him for meeting the constraints he encounters whilst achieving the objectives allocated to him.

The synthetic materials charged with monofilament or multi-strand fibres, which are twisted or otherwise and optionally assembled in strands, which are oriented or woven, are well known.

Preimpregnated thermoplastic or heat setting synthetic materials of this type are in existence. However, it is difficult to use them according to the prior art in order to produce steering wheels which are satisfactory. In particular, use then has to be made of very resistant plastic materials which are often expensive because they are very specific or alternatively they have to be employed in a very large quantity, which, in addition to the price, only increases the mass and the polar moment of inertia, that is to say with respect to the axis of the steering column.

The aim of the invention is to meet this type of problem by using a semi-manufactured product produced from a synthetic material in which relatively long fibres acting as a charge are incorporated.

This material is used in the form of blanks and when a reference is made in the present text to relatively long fibres this should be taken to mean fibres which are uninterrupted in the blank employed. Such fibres may be monofilament or multi-strand, twisted or otherwise and assembled into strands or cabled. These fibres may be oriented or woven.

The blanks mentioned below are made from a thermoplastic synthetic material, such as polypropylene, a polyamide or a preimpregnated, heat setting, synthetic material designated in the prior art with the name SMC (Sheet Moulding compound)

The fibres which are incorporated in this synthetic material are, for example, organic fibres such as those known commercially under the name KEVLAR, inorganic fibres such as glass or carbon or alternatively even metallic fibres.

This type of blank (as opposed to a preformed sheet) of semi-manufactured product is preferably produced by coextrusion, that is to say by means of simultaneous extrusion of the synthetic material and the fibres in order to produce a good and orderly orientation of the latter in the blanks of semi-manufactured product for the reasons which will emerge below.

As may be seen on the figures of the drawing, a steering wheel 10 comprises a central hub 11, a peripheral rim 12 and at least one approximately radial arm or branch 13 connecting the hub to the rim.

The hub 11 which is intended to connect the steering wheel to the free end of the casing of the steering column shaft is metallic in the conventional manner.

In order to manufacture a steering wheel according to the invention, use is made of a mould 30 comprising a punch 31 and a matrix 32. In this mould an impression 320 is provided which corresponds to the configuration and to the geometry of the steering wheel 10 to be produced.

As may be seen, in particular on FIGS. 1 and 2, the impression 320 of the mould is filled with blanks 20 of semi-manufactured product according to the invention. The various blanks are shaped to the geometry of the mould and they are arranged as represented, for example, in FIG. 2. Use may be made of blanks of an identical nature or of a different nature with respect to their synthetic material and/or their fibres and of identical or different dimensions in their various directions, as illustrated.

According to the invention, use is made of multiple blanks preferably placed edgewise in the impression such that the fibres perfectly fill the details, for example of ribs present in the impression.

This makes it possible to produce the openings in particular and at the same time to combine the orientation, the nature and the density of the fibres in order to optimize local resistence to stresses.

As may be seen by examining the figures, by virtue of the technique of the invention, it is possible to produce the steering wheel directly with openings, unlike what is done according to the prior art in which the starting point is not blanks, but sheets of stampable plastic material which are softened beforehand and then stamped, and in which it is necessary to make the openings after moulding.

As may be observed, according to the invention, the openings are produced directly by means of the arrangement and the distribution of the blanks in the impression.

The blanks, softened beforehand if required, thereby charged in the mould are then subjected to a stamping, that is to say they are compressed with sufficient energy and high speed.

It may then be observed that the synthetic material tends to flow, even to liquefy, and that the fibres follow the flow of the synthetic material during stamping to fill the details of the impression, the synthetic material acting as a binder similar to a mastic.

The adjustment parameters of the process take into account particularly the rheology peculiar to the synthetic material, in particular its viscosity with respect to the speed of impact at the instant of stamping.

By virtue of the invention, it is possible to produce ribs, turned-down edges and roundings on the steering wheel.

The choice of the shape of the mould, of the stamping speeds and energies is a function of the equipment available to the operator, the dimensions of the parts to be produced and of their geometry as well as of the nature of the synthetic materials and of the fibres employed.

By virtue of the invention, it is possible to produce a steering wheel in which the metallic hub is directly enclosed.

This is represented in FIG. 3A.

Instead of using a simple conventional hub, it is also possible to use a hub combined with an energy absorber which also makes it possible to improve the safety conditions.

Figure 3B:
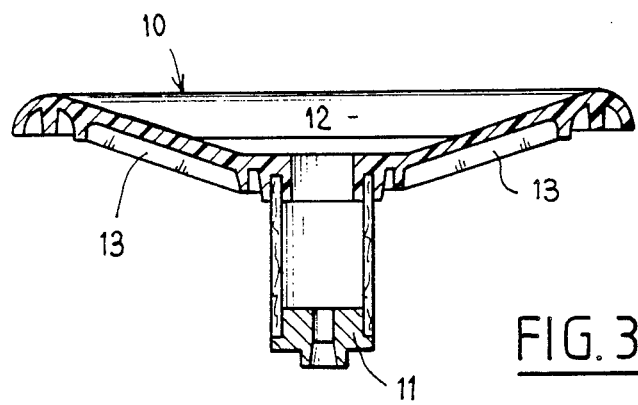

In FIG. 3B, a steering wheel according to the invention is illustrated which is equipped with a shock absorber such as that which is the subject of the Applicant's patent application No. 07/181,958, entitled "Steering wheel, particularly for a motor vehicle" filed on Apr. 15, 1988 (now U.S. Pat. No. 4,909,097). A composite energy absorber of this type may be replaced with a metal energy absorber as illustrated in FIG. 3C.

Figure 3C:
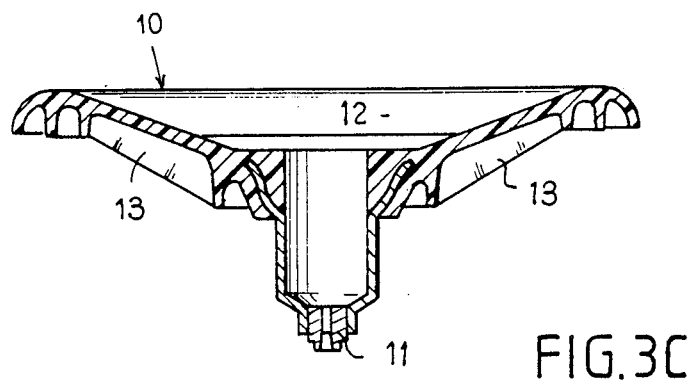

Corresponding parts in FIGS. 3A, 3B and 3C are designated by the same reference numerals followed by the letters A, B and C, respectively.

In FIG. 4, which gives a diagrammatic representation of a steering wheel according to the invention, viewed from below, the network of circular, oblique, radial or crossed ribs 15 which are produced may be observed. These ribs reinforced by long fibres make it possible to combine strength and lightness.

The entire advantage of the invention which makes it possible to produce, in a single operation, a steering wheel entirely made from synthetic material reinforced with long fibres without using internal or external metallic reinforcements and in which the only metallic part is, optionally, its hub, may therefore be seen.

As is current practice, the steering wheel according to the invention is equipped on the outside with a covering which gives it its final appearance and touch. This covering, for example in a polyurethane foam, is applied in any suitable conventional manner. Such a covering may act as "skin" or alternatively itself be covered with a covering in natural leather or in substitute leather.

What is claimed is:

1. Process for manufacturing a lightened steering wheel, particularly for a motor vehicle, comprising, a central hub, a peripheral rim and at least one approximately radial branch connecting the hub and the rim, using a mold having a punch and a matrix provided with an impression of the steering wheel to be produced, said process comprising the steps of: at least partially filling the mold with blanks of at least one synthetic material charged with long fibers, said blanks being unshaped relative to the shape of the manufactured steering wheel; and stamping these blanks with the punch directly to shape them, in one operation, into said lightened steering wheel.

2. Process according to claim 1, further comprising the step of placing the blanks edgewise in the impression of the mold.

3. Process according to claim 2, further comprising the step of heating the blanks before stamping.

4. Process according to claim 3, wherein said synthetic material is a thermoplastic, synthetic material.

5. Process according to claim 3, wherein said synthetic material is a heat setting synthetic material.

6. Process according to claim 4 or 5, wherein the fibers are selected from a group consisting of inorganic, organic and metallic fibers.

7. Process according to claim 6, wherein the fibers are selected from a group consisting of monofilament and multi-strand fibers.

8. Process according to claim 7, wherein the fibers are selected from a group consisting of twisted, cabled, oriented and woven fibers.

9. Process according to claim 1 or 2 wherein the fibers are continuous and uninterrupted in each blank.

* * * * *